United States Patent
Okabe

(10) Patent No.: US 7,495,397 B2
(45) Date of Patent: Feb. 24, 2009

(54) DRIVE DEVICE FOR LIGHT EMITTING DIODE ELEMENT, LIGHT SOURCE DEVICE, AND DISPLAY

(75) Inventor: Mitsuru Okabe, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/809,784

(22) Filed: May 30, 2007

(65) Prior Publication Data

US 2007/0296354 A1 Dec. 27, 2007

(30) Foreign Application Priority Data

Jun. 1, 2006 (JP) ............................ P2006-153791

(51) Int. Cl.
*G09G 3/22* (2006.01)
(52) U.S. Cl. ........................ 315/169.1; 345/102; 345/82
(58) Field of Classification Search ................. 345/204, 345/211, 214, 55, 82–84, 87, 102, 97; 315/169.1–169.3
See application file for complete search history.

(56) References Cited

U.S. PATENT DOCUMENTS

| 6,534,924 | B1 * | 3/2003 | Oguchi et al. ............. 315/169.1 |
| 7,002,547 | B2 * | 2/2006 | Yamada ....................... 345/102 |
| 7,235,954 | B2 * | 6/2007 | Murakami ................... 323/222 |
| 7,312,783 | B2 * | 12/2007 | Oyama ........................ 345/102 |
| 2005/0231459 | A1 * | 10/2005 | Furukawa .................... 345/102 |
| 2006/0082538 | A1 * | 4/2006 | Oyama ........................ 345/102 |

FOREIGN PATENT DOCUMENTS

JP 2001-210122 8/2001

* cited by examiner

*Primary Examiner*—Douglas W. Owens
*Assistant Examiner*—Jimmy T Vu
(74) *Attorney, Agent, or Firm*—Lerner, David, Littenberg, Krumholz & Mentlik, LLP

(57) ABSTRACT

A drive device for a light emitting diode element comprises a light emitting diode element circuit part configured to be formed by connecting at least one light emitting diode element based on a predetermined connection form, a power supply unit configured to generate a direct-current (DC) supply voltage for driving the light emitting diode element of the light emitting diode element circuit part for light emission of the light emitting diode element, and apply the DC supply voltage to the light emitting diode element circuit part, a power-supply application on/off unit configured to be provided to turn on/off application of the DC supply voltage to the light emitting diode element circuit part, and a current control circuit part configured to be caused to switch its operation so as to carry out constant current operation if application of the DC supply voltage is in an on-state and carry out voltage keeping operation if application of the DC supply voltage is in an off-state.

6 Claims, 10 Drawing Sheets

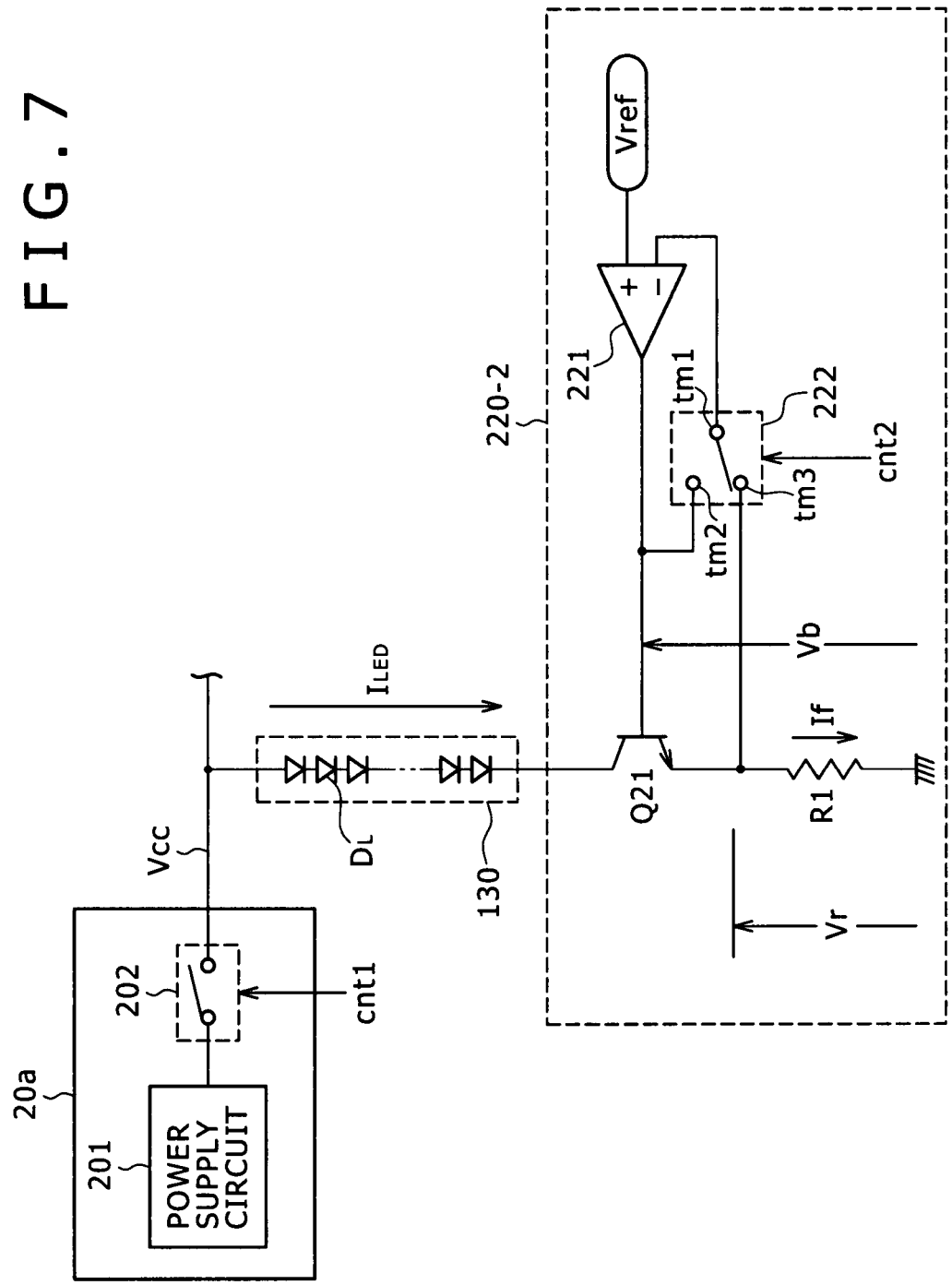
F I G . 7

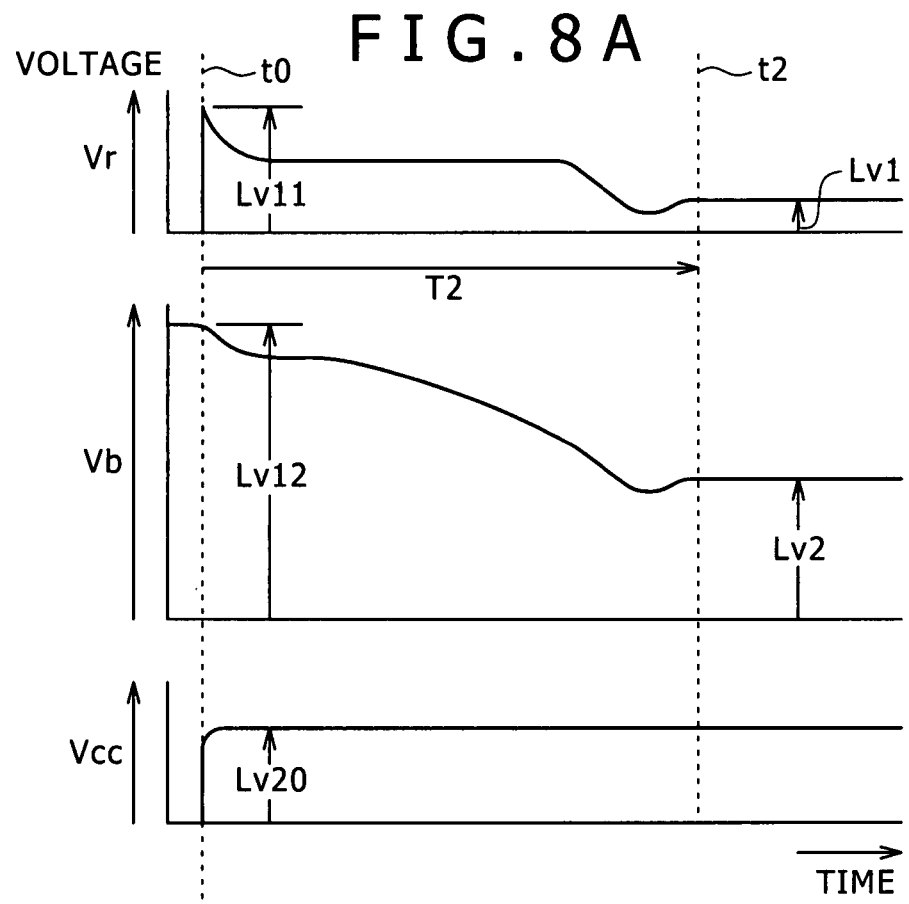
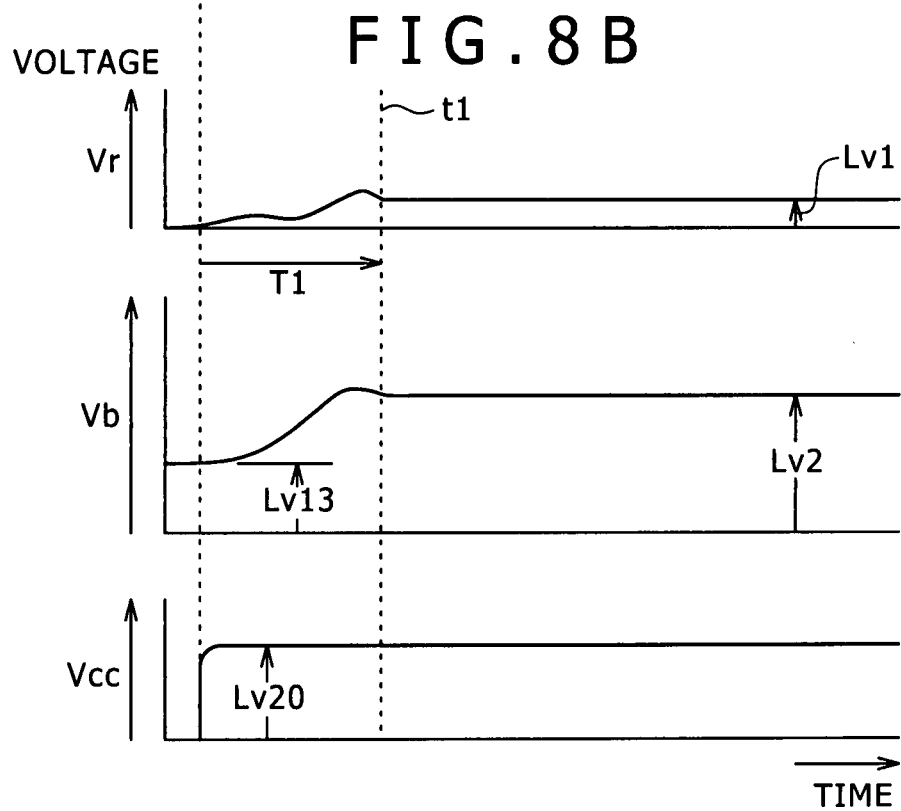

DRIVE DEVICE FOR LIGHT EMITTING DIODE ELEMENT, LIGHT SOURCE DEVICE, AND DISPLAY

CROSS-REFERENCE TO RELATED APPLICATIONS

This application claims priority from Japanese Patent Application No. JP 2006-153791 filed in the Japanese Patent Office on Jun. 1, 2006, the entire content of which is incorporated herein by reference.

BACKGROUND OF THE INVENTION

1. Field of the Invention

The present invention relates to a drive device for driving light emitting diode elements, a light source device including such a drive circuit for light emitting diode elements, and a display including such a light source device.

2. Description of the Related Art

As a display, a liquid crystal display that employs a liquid crystal panel is widely prevalent. As is well known, the liquid crystal panel is not a self-luminous panel but displays images through modulation of white light emitted from a light source device referred to as a so-called backlight based on a video signal.

Currently, a cold cathode fluorescent lamp is widely employed as the light source of the liquid crystal display. However, in recent years, because of enhancement of the light emission efficiency of a light emitting diode (LED) element (hereinafter, referred to simply as "light emitting diode"), a liquid crystal display that employs light emitting diodes as its light source is also becoming known. The light emitting diode has the following advantages over the cold cathode fluorescent lamp: the light emitting diode is better for the environment because mercury is not used as its material; the light emitting diode can be driven by lower voltage; and the light emitting diode has more favorable temperature characteristics and response characteristics, and a longer lifetime. Therefore, it is expected that the light emitting diode light source will be widely prevalent in the further.

An invention relating to a light source device (lighting device) that employs light emitting diodes as a light source for a liquid crystal display as described above is disclosed in e.g. Japanese Patent Laid-open No. 2001-210122. This patent document (see FIG. 10) shows a configuration for driving light emitting diodes for light emission thereof. In this configuration, a constant current is applied from a power supply unit (DC-DC converter) to a series connection circuit (LED row) arising from series connection of plural light emitting diodes. Furthermore, a switch element formed of an FET is further connected in series to the series connection circuit of the light emitting diodes, and this switch element is turned on/off by a pulse width modulation (PWM) signal for dimming control of the LEDs.

As described above, a certain level of basic technical configuration for driving light emitting diodes as a light source has been increasingly common. However, when some sort of conditions typified by the driving system and various specifications for image displaying in an actual liquid crystal panel are taken into consideration, there still remains ample room for improvement in the performance and reliability of e.g. the configuration for driving light emitting diodes for light emission thereof.

SUMMARY OF THE INVENTION

According to an embodiment of the present invention, there is provided a drive device for a light emitting diode element, having the following configuration.

Specifically, the drive device may include a light emitting diode element circuit part configured to be formed by connecting at least one light emitting diode element based on a predetermined connection form, and a power supply unit configured to generate a DC supply voltage for driving the light emitting diode element of the light emitting diode element circuit part for light emission of the light emitting diode element, and apply the DC supply voltage to the light emitting diode element circuit part. The drive device may further include a power-supply application on/off unit configured to be provided to turn on/off application of the DC supply voltage to the light emitting diode element circuit part, and a current control circuit part configured to be caused to switch its operation so as to carry out constant current operation if application of the DC supply voltage is in the on-state and carry out voltage keeping operation if application of the DC supply voltage is in the off-state. The constant current operation may implement variation control of the amount of a drive current that flows through the light emitting diode element circuit part by an amplified output voltage dependent upon a difference between a voltage detection value detected depending on the amount of the drive current and a predetermined reference voltage value. The voltage keeping operation may keep the amplified output voltage at a predetermined value of which difference from the reference voltage value may be within a predetermined range.

In the above-described configuration, the DC supply voltage generated by the power supply unit may be applied to the light emitting diode element circuit part to thereby cause the light emitting diode element in the light emitting diode element circuit part to emit light. Furthermore, the application of the DC supply voltage to the light emitting diode element circuit part may be turned on/off by the power-supply application on/off unit. This on/off control of the DC supply voltage may allow control of the emission/non-emission of the light emitting diode element in the light emitting diode element circuit part. In addition, in the embodiment of the present invention, when the DC supply voltage is in the on-state, the current control circuit part may carry out constant current operation to keep constant the amount of the drive current that flows from the DC supply voltage through the light emitting diode element circuit part. This operation may permit the light emitting diode element in the light emitting diode element circuit part to steadily emit light with constant luminance. In the constant current operation of the current control circuit part in the embodiment of the present invention, a voltage value (detected voltage value) that changes depending on the drive current amount may be detected, and variation control of the drive current amount may be implemented by an amplified output voltage dependent upon the difference between the detected voltage value and a reference voltage value.

Furthermore, in such a configuration in the embodiment of the present invention, when the DC supply voltage is in the off-state, the operation of the current control circuit part may be switched to voltage keeping operation by which the amplified output voltage may be kept at a predetermined value irrespective of e.g. the detected voltage value. If the current control circuit part carries out the constant current operation also when the DC supply voltage is in the off-state, the state where the amplified output voltage value reaches the maximum value in the variable range would possibly arise because the detected voltage value is substantially zero. This state may cause disadvantages typified by the lowering of the response speed until settlement of the amplified output voltage at a steady value after the DC supply voltage is turned to the on-state. In contrast, if the state where the amplified output voltage reaches the maximum value in the variable range is avoided through keeping of the amplified output voltage at a predetermined value by the voltage keeping operation, these disadvantages can be avoided.

As described above, the embodiment of the present invention is made for a configuration in which the emission/non-emission of light emitting diode elements may be controlled through turning on/off of a DC supply voltage, and may prevent an amplified output voltage from reaching the maximum value in the variable range when the DC supply voltage is in the off-state. Thus, the embodiment of the present invention may offer an advantage of eliminating disadvantages arising due to the rising-up of the amplified output voltage to the maximum value.

BRIEF DESCRIPTION OF THE DRAWINGS

FIG. 7 is a diagram showing a configuration example of drive circuitry for one LED series circuit according to the embodiment;

FIGS. 8A and 8B are waveform diagrams for comparison between the operation of the drive circuitry of FIG. 6 and that of the drive circuitry of FIG. 7;

DETAILED DESCRIPTION

A description will be made below about an example in which a best mode (hereinafter, referred to as an embodiment) for carrying out the present invention is applied to a liquid crystal display that is so configured as to display images based on an active-matrix system.

Figure 1:
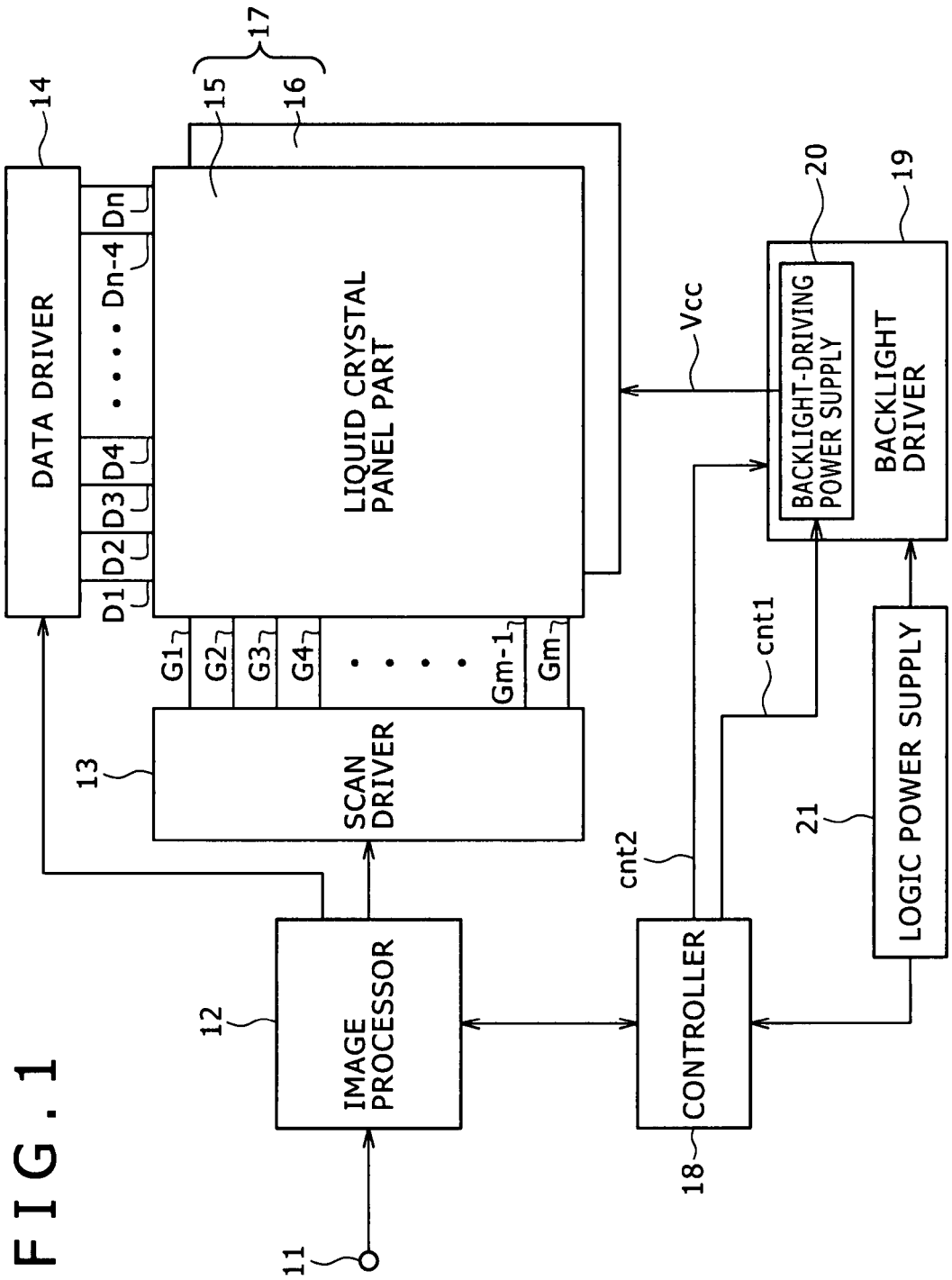
FIG. 1 is a block diagram showing a configuration example of a liquid crystal display as an embodiment of the present invention.

FIG. 1 is a block diagram showing an entire configuration example of the liquid crystal display of the present embodiment.

In this display, an image signal (video signal) as the source of an image to be displayed is input as e.g. a digital signal format signal from an input terminal 11 to an image processor 12. For the input image signal, the image processor 12 executes signal processing for various kinds of image quality adjustment, such as processing for conversion into a signal format adapted to displaying on an actual display panel (liquid crystal panel part) and processing for conversion into a resolution adapted to the numbers of horizontal/vertical pixels on the display panel. Furthermore, based on the thus processed signal, the image processor 12 produces input signals to be used by a vertical scan driver 13 and a data driver 14 for display driving. The input signal from the image processor 12 to the vertical scan driver 13 is e.g. a timing signal for indicating the timings of scanning of the horizontal lines (gate lines) in the vertical direction dependent upon the frame cycle. The input signal to the data driver 14 is data to be applied to pixels (data lines) of one horizontal line in linkage with the scanning timings of the gate lines.

A display panel 17 is formed of a liquid crystal panel part 15 and a backlight part 16 that is provided on the back face side of the liquid crystal panel part 15.

As is well known, the liquid crystal panel part 15 is formed by enclosing a liquid crystal layer between glass substrates and arranging pixel cells (pixel cell drive circuits) in accordance with a predetermined resolution into a matrix on e.g. a semiconductor substrate. That is, the liquid crystal panel part 15 has a configuration for an active-matrix system.

In this liquid crystal display, the backlight part 16 is formed by arranging a predetermined number of light emitting diodes as a light source into a predetermined arrangement pattern. White light arising from lighting of the light emitting diodes is emitted, after being scattered for example, from the back face side of the liquid crystal panel 15 toward the front face side thereof. As a method for obtaining white light by using light emitting diodes, e.g. a method of using white light emitting diodes is available. In addition, another technique is also known and can be employed in which light emitting diodes of colors corresponding to the RGB three primary colors or more colors emit light and white light is obtained as the synthetic light of the emitted light.

A DC supply voltage Vcc output by a backlight driver 19 is applied to the light emitting diodes included in the backlight part 16, so that the light emitting diodes are driven to emit light.

The DC supply voltage Vcc for causing the light emitting diodes of the backlight part 16 to emit light is generated by a backlight-driving power supply 20 included in the backlight driver 19. The backlight driver 19 applies the thus generated DC supply voltage Vcc to the light emitting diodes of the backlight part 16, and includes also a constant current circuit that implements control so that the amount of the current flowing through the light emitting diodes can be kept constant, in response to the application of the DC supply voltage Vcc. Furthermore, the backlight driver 19 of the present embodiment is so configured as to turn on/off (execute/stop) the application of the DC supply voltage Vcc to the light emitting diodes in accordance with control by a controller 18.

FIG. 1 shows also a logic power supply 21.

The logic power supply 21 generates a predetermined supply voltage that should be supplied to circuit parts called a logic circuit or the like and serving as the controller 18, such as a CPU, ROM and RAM. In the present embodiment, the supply voltage generated by the logic power supply 21 is supplied also to the backlight driver 19. The backlight driver 19 utilizes the supply voltage from the logic power supply 21 as e.g. a reference voltage in the constant current control circuitry as described later.

The pixel cells in the liquid crystal panel part 15 are disposed at the positions corresponding to the intersections between gate lines G1 to Gm led out from the vertical scan driver 13 and data lines D1 to Dn led out from the data driver 14. The vertical scan driver 13 and the data driver 14 drive the gate lines and the data lines at e.g. already-known predetermined timings. This driving changes the polarization direction of the liquid crystal layer corresponding to the pixel cells, which modulates light that is to pass from the back face side of the liquid crystal panel part 15 to the front face side thereof. As a result, an image is displayed on the screen of the liquid crystal panel part 15.

The controller 18 implements various kinds of control in the liquid crystal display and is configured as a microcomputer including a CPU and RAM also as described above. In this liquid crystal display, the controller 18 implements control for the image signal processor 12 and control for the backlight driver 19. In FIG. 1, control signals cnt1 and cnt2 are shown as signals for the control of the backlight driver 19 by the controller 18. Details of the control based on these signals will be described later.

A description will be made below about the configuration of the backlight part 16 and a configuration example of the backlight driver 19 for driving the light emitting diodes for light emission thereof in the present embodiment.

In the present embodiment, light emitting diodes that emit light having the respective primary colors of red (R), green (G) and blue (B) are used. Specifically, to obtain white light, light obtained by causing the light emitting diodes of the respective colors R, G and B to emit light is subjected to optical color mixing based on additive synthesis.

Figure 2A:
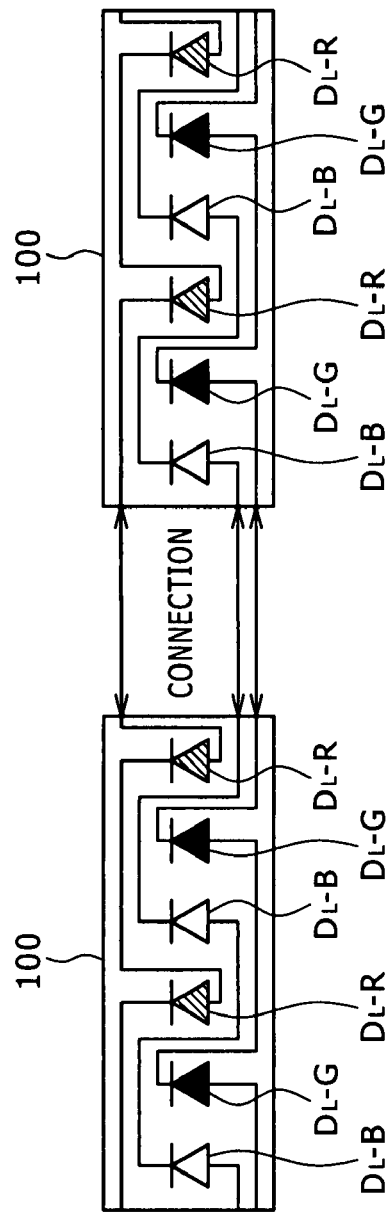
FIGS. 2A and 2B are diagrams showing a configuration example of an LED cell and an LED cell unit included in a backlight panel of the embodiment.
Figure 2B:
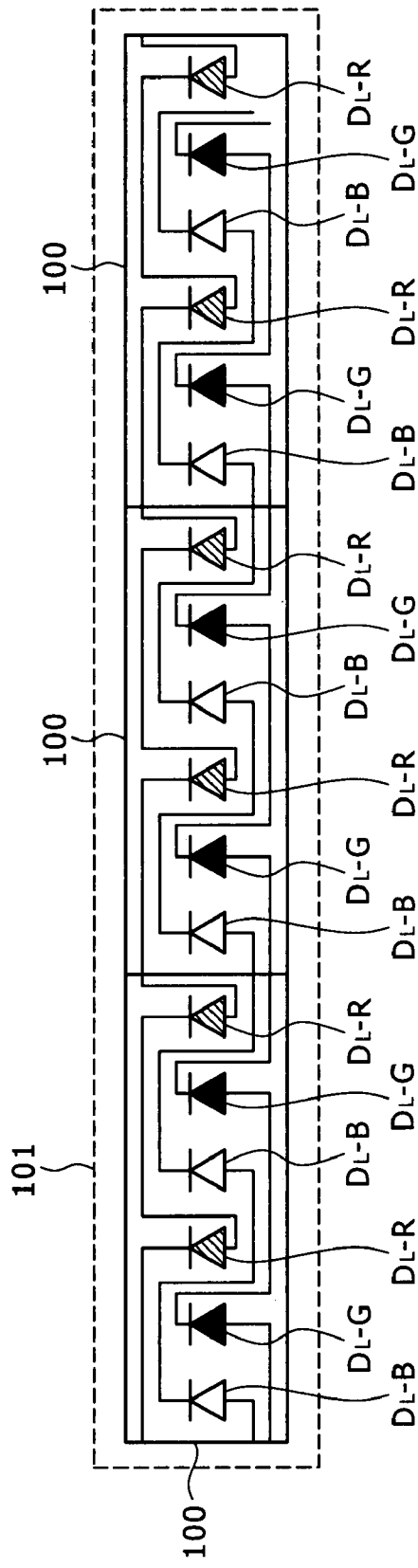

FIGS. 2A and 2B show basic configuration examples of the backlight part 16 when light emitting diodes corresponding to the three primary colors R, G, and B are used as described above.

As shown in FIG. 2A, a light emitting diode (LED) cell 100 is defined as the minimum unit of the components of the backlight part 16. To form the LED cell 100, a predetermined number of light emitting diodes of predetermined colors are prepared and these light emitting diodes are arranged at predetermined positions on a substrate or the like. Furthermore, the arranged light emitting diodes are electrically connected to each other based on a predetermined pattern. For each LED cell 100 of FIG. 2A, two red light emitting diodes DL-R corresponding to red (R), two green light emitting diodes DL-G corresponding to green (G), and two blue light emitting diodes DL-B corresponding to blue (B), i.e., the total six light emitting diodes are prepared. As shown in the drawing, these light emitting diodes are arranged in the order of blue-green-red-blue-green-red from the left to the right. In addition, the light emitting diodes of each color are connected in series to each other with the same polarity order.

As shown in FIG. 2A, the thus formed LED cell 100 can be connected to other same-type LED cells 100 through both the anode side and the cathode side of the serially-connected light emitting diodes of the respective colors R, G and B. As the connecting of the LED cells 100 is further advanced in this manner, the number of the serially-connected light emitting diodes of each of the colors R, G and B increases depending on the number of the connected LED cells.

A component arising from connection of the required number of LED cells 100 is defined as one unit. As a specific example, FIG. 2B shows one unit formed by connecting three LED cells 100. This unit will be referred to as an LED cell unit 101 hereinafter. Because one LED cell 100 includes two light emitting diodes for each of the colors R, G and B, the number of light emitting diodes as the light emission source of the LED cell 100 will be expressed as (2R, 2G, 2B) hereinafter. In the example of FIG. 2B, the LED cell unit 101 is composed of three LED cells 100, and hence the number of light emitting diodes in one LED cell unit 101 can be expressed as 3(2G, 2R, 2B)=(6G, 6R, 6B).

Figure 3:
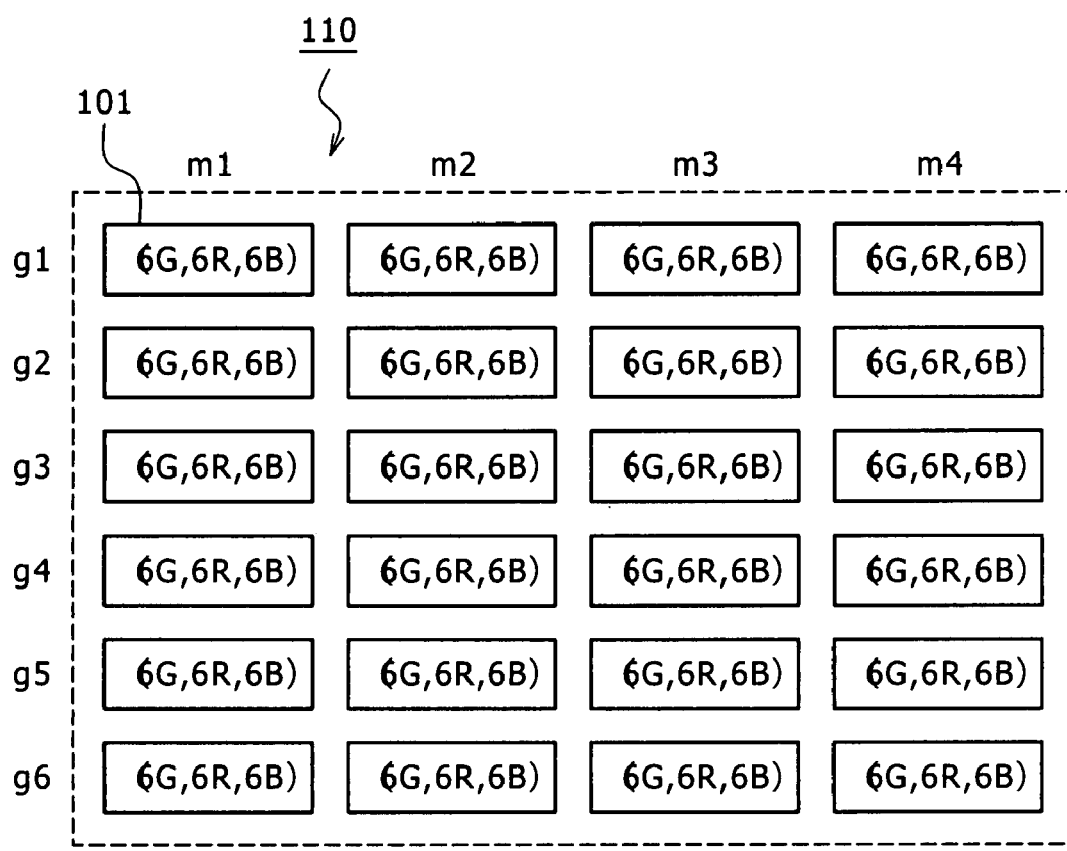
FIG. 3 is a diagram showing an example of the arrangement pattern of the LED cell units in the backlight panel of the embodiment.

The light emitting diodes are planarly arranged in units of the LED cell unit 101 formed in the above-described manner, to thereby construct a panel having e.g. a backlight function. FIG. 3 shows an example of a backlight panel 110 formed of the LED cell units 101 shown in FIG. 2B.

In the example of FIG. 3, the backlight panel 110 is formed by arranging the LED cell units 101 in a matrix of six rows by four columns, i.e., rows g1 to g6 by columns m1 to m4.

In the backlight panel 110, the number of the red light emitting diodes DL-R is 6×6×4=144. Similarly, the numbers of the green light emitting diodes DL-G and the blue light emitting diodes DL-B are also 144. Therefore, the backlight panel 110 includes total 432 (=144×3) light emitting diodes.

In the present embodiment, the thus formed backlight panel 110 is included in the backlight part 16.

It should be noted that the configuration of the backlight part 16 (LED cell 100, LED cell unit 101, backlight panel 110) described with FIGS. 2A and 2B and 3 is merely one example. The following factors may be adequately changed: the numbers and the arrangement form of light emitting diodes of R, G and B included in the LED cell 100; the number and the connection form of the LED cells 100 in the LED cell unit 101; and the number and the arrangement form of the LED cell units 101 in the backlight panel 110.

Figure 4:
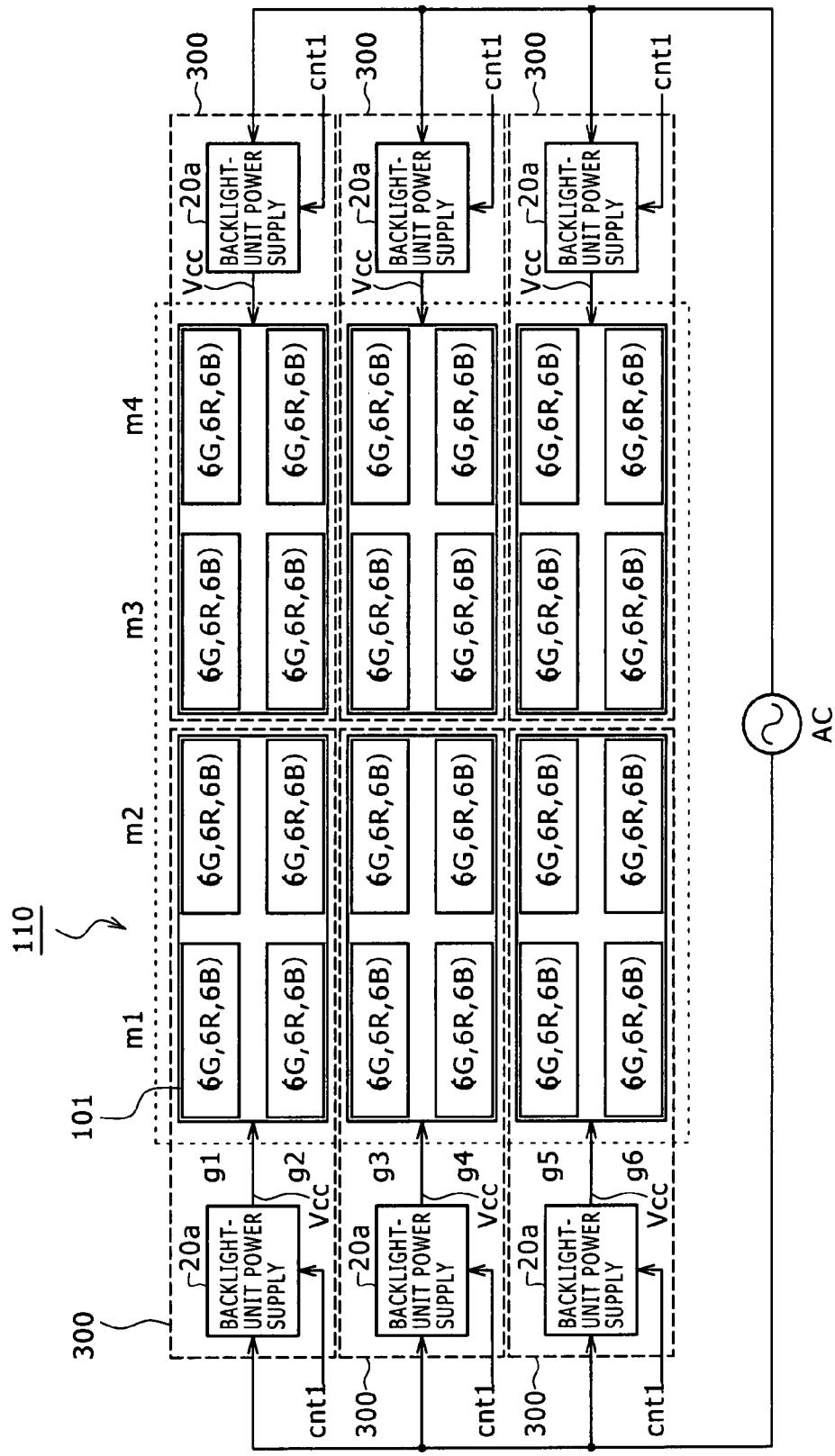
FIG. 4 is a diagram showing one example of a configuration in which the backlight panel shown in FIG. 3 is divided into plural backlight units.

FIG. 4 shows an example of the connection form of power supply units for driving the light emitting diodes in the backlight part 16 (backlight panel 110) having the configuration shown in FIGS. 2A and 2B and 3.

In FIG. 4, the backlight panel 110 of FIG. 3 is shown. For driving of the light emitting diodes in the backlight panel 110, as shown by backlight units 300 in the drawing, the backlight panel 110 is divided into groups each including four LED cell units 101 of vertical two by horizontal two. In this backlight panel 110, twenty-four LED cell units 101 are arranged on the rows g1 to g6 and the columns m1 to m4. Therefore, the backlight panel 110 is divided into six backlight units 300 of three rows by two columns.

Furthermore, a backlight-unit power supply unit 20a is assigned to each of the backlight units 300 resulting from this division. By a DC supply voltage Vcc output from the backlight-unit power supply 20a, the light emitting diodes included in each backlight unit 300 are driven to emit light.

The backlight-driving power supply 20 shown in FIG. 1 is a part including plural backlight-unit power supplies 20a each corresponding to a respective one of the backlight units 300. Each of the backlight-unit power supplies 20a is fed with a commercial alternating-current supply voltage AC so as to produce and output the DC supply voltage Vcc.

The arrangement form of the LED cell units 101 in one backlight unit 300 is not limited to that shown in FIG. 4 but may be adequately changed depending on various conditions in an actual backlight panel. As other arrangement forms, the backlight unit 300 can be formed of the LED cell units 101 on entire one row or entire one column for example.

Figure 5:
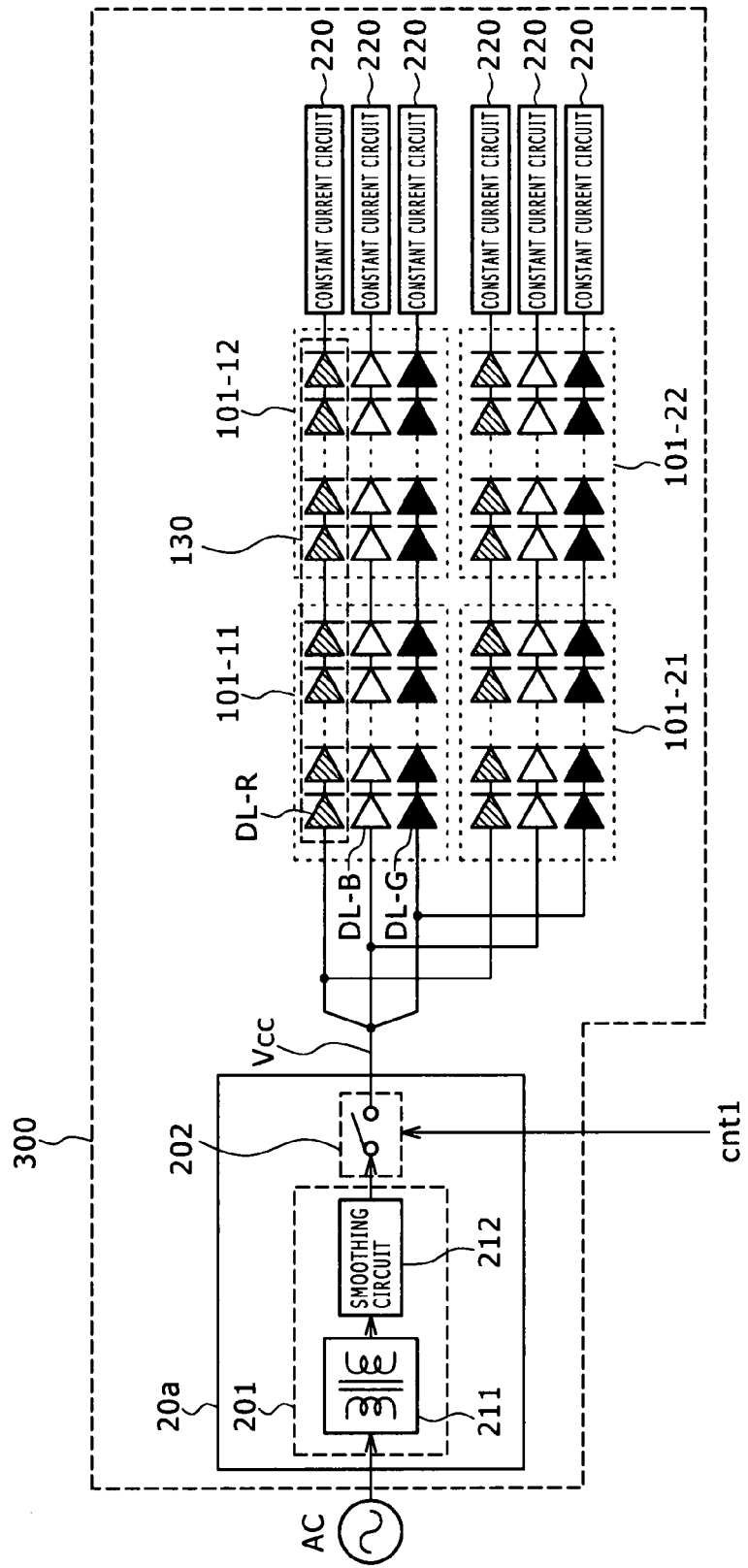
FIG. 5 is a diagram showing a configuration example of drive circuitry for light emitting diodes in the backlight unit according to the embodiment.

FIG. 5 shows an example of the circuit form for driving the light emitting diodes in the LED cell units 101 in one backlight unit 300 shown in FIG. 4. Furthermore, FIG. 5 shows an internal configuration example of the backlight-unit power supply 20a.

The backlight-unit power supply 20a is fed with the commercial alternating-current supply voltage AC through a power supply circuit 201 and produces a predetermined DC voltage. For this purpose, the power supply circuit 201 includes a transformer 211 and a smoothing circuit 212. The commercial alternating-current supply voltage AC is input to the primary side of the transformer 211. The transformer 211 outputs to its secondary side an AC voltage having a voltage value dependent upon the winding ratio between the primary and secondary sides. This AC voltage is converted into a DC voltage by a smoothing circuit formed of e.g. a rectifier element and a smoothing capacitor and having a predetermined format. The thus obtained DC voltage is applied as the DC supply voltage Vcc to the light emitting diodes. It should be noted that this DC supply voltage Vcc is applied via a power-supply on/off switch 202 in the present embodiment.

The power-supply on/off switch 202 is turned on/off by the control signal cnt1 output by the controller 18. When the power-supply on/off switch 202 is in the on-state, the DC supply voltage Vcc is applied to an LED series circuit 130 to be described below. When the switch 202 is in the off-state, the voltage Vcc is not applied. The necessity of the changeover of the power-supply on/off switch 202 and the form of the changeover control will be described later. As the power-supply on/off switch 202, a transistor element such as an FET (field effect transistor) is selected.

The DC supply voltage Vcc output via the power-supply on/off switch 202 as described above is applied to the light emitting diodes in the backlight unit 300 based on the connection form to be described below.

In FIG. 5, of four LED cell units 101 on two rows and two columns in the backlight unit 300, the units positioned at the upper row and the left column, at the upper row and the right column, at the lower row and the left column, and at the lower row and the right column are represented as LED cell units 101-11, 101-12, 101-21, and 101-22, respectively. If the backlight unit 300 of FIG. 5 is formed of the LED cell units 101 on the rows g1 and g2 and the columns m1 and m2 in FIG. 4 for example, the LED cell units 101-11, 101-12, 101-21, and 101-22 are equivalent to the LED cell units in FIG. 4 positioned at the coordinates (g1, m1), (g1, m2), (g2, m1), and (g2, m2), respectively.

In the example of FIG. 5, across the LED cell units 101-11 and 101-12 on the upper row, a series connection circuit of the light emitting diodes (DL-R, DL-G, DL-B) is formed for each of the colors R, G and B. That is, three LED series circuits (light emitting diode element circuit parts) 130 each corresponding to a respective one of the colors R, G and B are formed. Similarly, also across the LED cell units 101-21 and 101-22 on the lower row, three LED series circuits 130 each corresponding to a respective one of the colors R, G and B are formed. Therefore, in the example of FIG. 5, six LED series circuits 130 are formed in one backlight unit 300.

To the DC supply voltage Vcc output from the backlight-unit power supply 20a, the anode-side ends of these six LED series circuits 130 are connected. That is, one DC supply voltage Vcc is applied to six LED series circuits 130 in parallel.

Furthermore, a constant current circuit 220 is provided for each of six LED series circuits 130.

Figure 6:
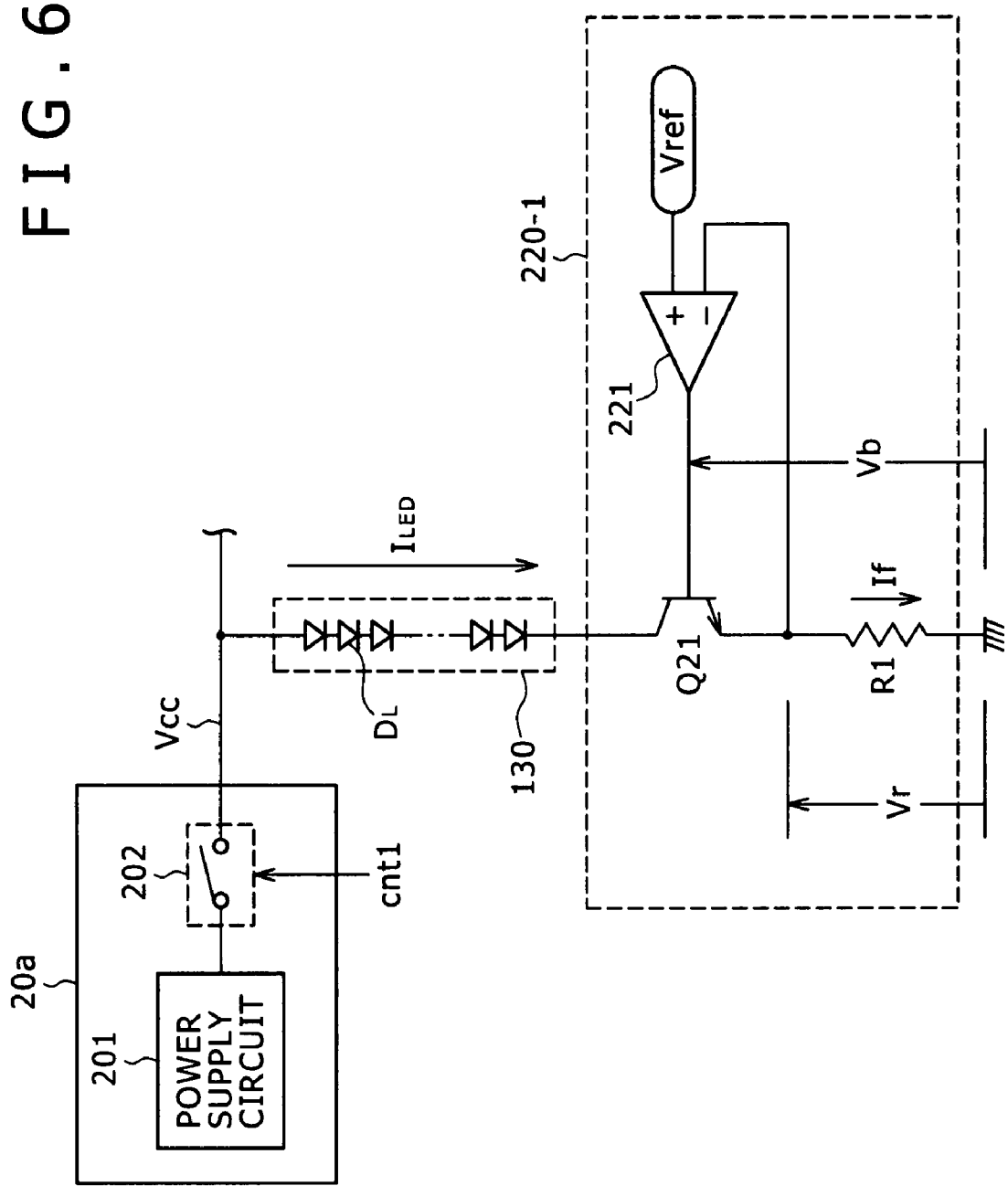
FIG. 6 is a diagram showing one example of a configuration that would be available as drive circuitry for one LED series circuit in the backlight unit of FIG. 5.

FIG. 6 shows a configuration obtained by extracting the components relating to one LED series circuit 130 from the configuration of FIG. 5. In FIG. 6, a probably-reasonable internal configuration example of the constant current circuit 220 shown in FIG. 5 is shown as a constant current circuit 220-1.

The line of the DC supply voltage Vcc output from the backlight-unit power supply 20a is connected to the anode-side end of the LED series circuit 130. Although not shown in this drawing, this line of the DC supply voltage Vcc is branched and connected also to the anode-side ends of the other remaining five LED series circuits 130.

The constant current circuit 220-1 is provided between the cathode-side end of the LED series circuit 130 and the ground.

In the constant current circuit 220-1 shown in FIG. 6, the collector of an NPN transistor Q21 (amplifier element) is connected to the cathode-side end of the LED series circuit 130, while the emitter thereof is connected to the ground via a drive current detection resistor R1. The base of the transistor Q21 is connected to the output terminal of an operational amplifier 221. A reference voltage Vref is input to the non-inverting input terminal of the operational amplifier 221. This reference voltage Vref is produced by utilizing the DC supply voltage output from the logic power supply 21 shown in FIG. 1. The inverting input terminal of the operational amplifier 221 is coupled to the connecting node between the emitter of the transistor Q21 and the drive current detection resistor R1. Also for the power supply of the operational amplifier 221, the DC supply voltage output from the logic power supply 21 is utilized.

The operation for driving the light emitting diodes DL in the LED series circuit 130 for light emission thereof based on the above-described configuration will be described below together with the operation of the constant current circuit 220-1.

When the power-supply on/off switch 202 in the backlight-unit power supply 20a is kept at the on-state and hence the DC supply voltage Vcc is effectively applied to the LED series circuit 130, the DC supply voltage Vcc serves as a current source and thus a drive current ILED flows through the LED series circuit 130. Due to this current flow, the light emitting diodes DL of the LED series circuit 130 are driven to emit light. This drive current ILED flows via the collector and emitter of the transistor Q21 to the drive current detection resistor R1 as a detected current If. The value of the voltage across the drive current detection resistor R1 is input to the inverting input terminal of the operational amplifier 221. The voltage across the drive current detection resistor R1 changes depending on the detected current If. That is, the voltage changes depending on the current amount of the drive current ILED.

According to the connection form of the constant current circuit 220-1 in this example, a differential amplifier circuit functions. Therefore, the operational amplifier 221 in this example outputs from its output terminal a voltage value dependent upon the error between the voltage across the drive current detection resistor R1 and the reference voltage Vref, to thereby implement control so that the voltage across the drive current detection resistor R1 and the reference voltage Vref may become equivalent to each other. The transistor Q21 varies the collector current depending on the output voltage of the operational amplifier 221, and thereby the drive current ILED (detected current If) is controlled so as to be kept constant at a predetermined amount. That is, constant current control is implemented. Furthermore, this operation is carried out through feedback of the drive current ILED controlled by the operational amplifier 221 as the detected current. Therefore, the constant current circuit 220-1 can be regarded as a unit that implements current-feedback control.

This constant current control allows the light emitting diodes DL in the LED series circuit 130 to emit light in such a manner as to constantly keep a predetermined luminance designed in advance. Keeping constant the luminance of the light emitting diodes can offer uniform luminance without unevenness across the entire backlight panel 110 for example. In general, the light emission efficiency of light emitting diodes differs among the colors R, G and B. Therefore, using the same drive current amount for all the colors leads to variation in the emission luminance among the colors, which makes it difficult to obtain proper white light. To address this, for example, the reference voltage Vref in the constant current circuit 220-1 is regulated and designed for each of the colors R, G and B separately, which allows the luminance of the LED series circuit 130 (light emitting diodes) of each of the colors R, G and B to be so designed that favorable white light can be achieved.

In the configuration for driving the light emitting diodes in the present embodiment, on/off control of the application of the DC supply voltage Vcc to the LED series circuits 130 is allowed through the provision of the power-supply on/off switch 202 as shown in FIGS. 5 and 6. In the present embodiment, the function of the on/off control of the DC supply voltage Vcc is provided to meet the following demand.

It has become known that in recent liquid crystal displays, the entire surface of a backlight corresponding to a display screen area is not constantly driven to emit light but a scheme referred to as so-called partial light emission driving is employed. In the partial light emission driving, the backlight configuration is so designed that light emission can be switched on/off independently for each of divided areas arising from division of the entire surface of the backlight corresponding to a display screen area based on a predetermined pattern. In addition, the light emission of each divided area is switched on/off at appropriate timings according to need.

For example, such partial light emission driving is carried out to increase the black luminance for the purpose of e.g. enhancement of image contrast. Specifically, when a black image part is to appear in a displayed image, light emission of the divided area corresponding to the black image part is temporarily stopped. Such control prevents leakage and transmission of light from the backlight in the display screen part corresponding to this divided area, which allows reproduction of an image with further faithful black.

Furthermore, when display driving is based on a linear-sequential system and hence a part in which displaying is not carried out actually and therefore black appears arises in a frame period, execution of the partial light emission driving for this non-displaying part shortens the total accumulated time of the light emission driving, and thus can offer an effect of reduction of power consumption for example. In addition, a scheme called black image insertion is known. In this scheme, black is intentionally displayed within a frame period in order to eliminate movement blur. Also when the partial light emission driving is carried out for an image area in which a black image is displayed for the movement blur elimination, an effect of reduction of power consumption can be achieved similarly. Moreover, further enhancement of an effect of the movement blur suppression is also expected.

In order to allow the above-described partial light emission driving, the liquid crystal display of the present embodiment also employs a configuration in which, as shown in FIG. 4 for example, one backlight panel 110 corresponding to the entire display screen area is divided into plural (six, in FIG. 4) backlight units 300 and the backlight-unit power supply 20a is assigned to each of the backlight units. Furthermore, the power-supply on/off switch 202 is provided in each backlight-unit power supply 20a and the controller 18 outputs the control signal cnt1 to the switch 202. This allows the on/off control of the DC supply voltage Vcc. Also as described above, when the power-supply on/off switch 202 is controlled to be in the on-state, the DC supply voltage Vcc is effectively applied, so that the light emitting diodes in the LED series circuit 130 are driven to emit light. When the power-supply on/off switch 202 is controlled to be in the off-state, the application of the DC supply voltage Vcc is stopped, so that the light emitting diodes in the LED series circuit 130 are controlled so as not to emit light. In this manner, the present embodiment is so configured that the partial light emission driving can be carried out independently for each of the divided areas as the backlight units 300.

As described above, in the present embodiment, for the purpose of e.g. partial light emission driving, the power-supply on/off switch 202 is provided in each backlight-unit power supply 20a for on/off control of the DC supply voltage Vcc. However, the combination of the configuration for the on/off control of the DC supply voltage Vcc and the configuration of the constant current circuit 220-1 shown in FIG. 6 causes the following disadvantage. Also as described above, the configuration of the constant current circuit 220-1 of FIG. 6 would be regarded as one of probably most reasonable configurations, when it is combined with a power supply involving no switching operation, i.e., a so-called linear power supply, like the backlight-unit power supply 20a of the present embodiment.

In the circuit configuration shown in FIG. 6, the constant current circuit 220-1 operates constantly irrespective of switching on/off of application of the DC supply voltage Vcc in response to turning on/off of the power-supply on/off switch 202. Specifically, the supply voltage from the logic power supply 21 is constantly supplied to the operational amplifier 221. Furthermore, the reference voltage Vref is constantly produced by utilizing the supply voltage from the logic power supply 21 so as to be input to the non-inverting input terminal.

When the power-supply on/off switch 202 is in the on-state and therefore the DC supply voltage Vcc is applied in the circuit shown in FIG. 6, the light emitting diodes of the LED series circuit 130 are driven to emit light and the constant current circuit 220-1 executes constant current operation as described above.

When, in this state, the power-supply on/off switch 202 is turned from the on-state to the off-state based on control by the controller 18 and thus the application of the DC supply voltage Vcc is stopped, the drive current ILED, which originates from the DC supply voltage Vcc, does not flow through the LED series circuit 130, and hence the light emission of the light emitting diodes is also stopped.

However, the flow of the detected current If is also stopped because the flow of the drive current ILED is thus stopped, and therefore a detected voltage Vr as the voltage across the drive current detection resistor R1 becomes zero. The operational amplifier 221 in this configuration operates as a differential amplifier circuit for constant current control: it amplifies a voltage dependent upon the difference between the voltage value input to the non-inverting input terminal and that input to the inverting input terminal by the infinite amplification rate, and outputs the amplified voltage. The operation of the operational amplifier 221 is continued irrespective of switching on/off of the DC supply voltage Vcc as described above. Therefore, when the voltage across the drive current detection resistor R1 is zero, the voltage saturated at the maximum output value is output from the output terminal of the operational amplifier 221. That is, when the power-supply on/off switch 202 is in the off-state and thus the DC supply voltage Vcc is not applied, the potential Vb at the output terminal of the operational amplifier 221 rises to the maximum output value of the operational amplifier 221.

A description will be made below about the situation where the power-supply on/off switch 202 is turned from the off-state to the on-state based on control by the controller 18 and hence the application of the DC supply voltage Vcc is started. FIG. 8A shows the waveforms of the detected voltage Vr as the voltage across the drive current detection resistor R1, the potential Vb at the output terminal of the operational amplifier 221, and the DC supply voltage Vcc (potential obtained on the anode side of the LED series circuit 130), relating to the timing of the application start of the DC supply voltage Vcc.

In FIG. 8A, at the timing t0, the power-supply on/off switch 202 is turned from the off-state to the on-state. In response to this turning-on, the DC supply voltage Vcc rises up from the zero level to a predetermined level at the timing t0.

Also as described above, before the timing t0, the potential Vb of the output terminal of the operational amplifier 221 takes the maximum output value Lv12 of the operational amplifier 221. Therefore, when the application of the DC supply voltage Vcc is started and the transistor Q21 conducts at the timing t0, the excessive drive current ILED flows. Sharp rising-up of the detected voltage Vr to a value (Lv11) greatly higher than a steady value Lv1 at the timing to of FIG. 8A reflects the flow of the drive current ILED (detected current If) with the problematically excessive amount.

After the timing t0, the operational amplifier 221 is fed with the sharply raised detected voltage Vr through its inverting input terminal and operates as a differential amplifier circuit. Specifically, the operational amplifier 221 operates to change from the state where the maximum output value Lv12 is output from the output terminal as the potential Vb and settle at the state where a target voltage value Lv2 corresponding to the target drive current ILED (detected current If) is output.

In FIG. 8A, the timing at which the potential Vb is settled at the target voltage value Lv2 and the constant current control enters the steady state after the timing t0 is indicated as the timing t2. That is, the period until the output (potential Vb) of the operational amplifier 221 is settled at the target voltage value Lv2 after changing from the maximum output value Lv12 is equivalent to the period T2 from the timing t0 to the timing t2.

The time length of the period from the timing t0, at which the DC supply voltage Vcc is turned on, until the settlement at the target voltage value Lv2 will be referred to also as constant-current response time, hereinafter. After the timing t2 in FIG. 8A, which is the end timing of the constant-current response time, the state where the drive current ILED is kept constant at its target value is maintained. A voltage value Lv1 obtained as the detected voltage Vr after the timing t2 reflects the state where the drive current ILED (detected current If) as the target value current flows.

Actual constant-current response time as the period T2 is e.g. about 5 to 7 μs. However, when the turning on/off of the power-supply on/off switch 202 is for the purpose of partial light emission driving as described above for example, shorter constant-current response time may be required.

Specifically, the partial light emission driving is carried out for the purposes of securing of black luminance, reduction of power consumption through stopping of light emission for non-displaying areas, and so on as described above. For these purposes, the emission state and the non-emission state of light emitting diodes have to be switched instantaneously in response to e.g. frame switching timings. Furthermore, for this instantaneous switching, it may be required that the period of the unstable emission state, equivalent to the constant-current response time, be as short as possible in the state transition between the emission state and the non-emission state. During the constant-current response time, the steady value is not obtained as the drive current ILED and hence the emission luminance of the light emitting diodes in the LED series circuit 130 is unstable. Therefore, the longer the constant-current response time is, the more easily an image reflecting the unstableness of the emission luminance is recognized. Furthermore, the timings of switching between the emission state and the non-emission state of the light emitting diodes (backlight unit) may not follow the timings of frame-by-frame image changes. These factors deteriorate the image quality.

It has been found that the constant-current response time has to be shortened to e.g. about 2 μs in order to allow e.g. the liquid crystal display corresponding to the present embodiment to instantaneously switch the emission state and the non-emission state of light emitting diodes for visual recognition.

However, an operational amplifier has a constant slew rate as its characteristic. The slew rate of the operational amplifier 221 is indicated by the slope of the waveform of the potential Vb in FIG. 8A, obtained during the period from the timing t0 to the timing t2. For the operation of the constant current circuit 220-1 of FIG. 6, the potential difference between the maximum output value Lv12 and the target voltage value Lv2 as the potential Vb (output voltage of the operational amplifier 221) is considerably large as shown in FIG. 8A. Accordingly, it takes about 5 to 7 μs for the output (potential Vb) of the operational amplifier 221 to be settled at the target voltage value Lv2 after changing from the maximum output value Lv12. This time is considerably long. An operational amplifier may not vary the output voltage value with higher-speed response beyond the change rate per unit time as its slew rate. Therefore, it is difficult for the configuration of the constant current circuit 220-1 of FIG. 6 to offer constant-current response time shorter than about 5 to 7 μs.

Furthermore, for a liquid crystal display, there has been also proposed a display driving scheme called high-frame-rate driving, in which frame images are displayed with a cycle shorter than a typical frame cycle. Even if a display with the constant-current response time of FIG. 8A can carry out partial light emission driving when display driving with a typical frame cycle is employed, the display would possibly be unable to carry out the partial light emission driving when the high-frame-rate display driving is employed. Consequently, in terms of e.g. the partial light emission driving, it is preferable that the response speed of the DC supply voltage Vcc be increased as much as possible.

Therefore, to avoid the above-described disadvantage, the present embodiment employs the configuration as a constant current circuit 220-2 shown in FIG. 7 instead of the constant current circuit 220-1 shown in FIG. 6. The same parts in FIG. 7 as those in FIG. 6 are given the same numerals and description thereof will be omitted.

The constant current circuit 220-2 shown in FIG. 7 is provided with a circuit changeover switch 222. This circuit changeover switch 222 allows a terminal tm1 to be selectively connected to either one of terminals tm2 and tm3. The terminal tm1 is connected to the inverting input terminal of the operational amplifier 221 and the terminal tm2 is connected to the output terminal of the operational amplifier 221. The terminal tm3 is coupled to the connecting node between the emitter of the transistor Q21 and the drive current detection resistor R1.

The switching of the circuit changeover switch 222 is carried out based on the control signal cnt2 output by the controller 18. That is, the switching of the circuit changeover switch 222 is controlled by the controller 18. As an actual switch 222, an analog switch formed of e.g. a semiconductor element is employed.

The operation of the circuit shown in FIG. 7 is as follows.

In the configuration shown in FIG. 7, the controller 18 implements switching control of the circuit changeover switch 222 in addition to on/off control of the power-supply on/off switch 202. Similarly to the above description, the power-supply on/off switch 202 is turned on/off at adequate timings dependent upon the display driving timings and the contents of displayed images for the purpose of e.g. partial light emission driving. In addition to this, the circuit changeover switch 222 is so switched as to connect the terminal tm1 to the terminal tm3 when the power-supply on/off switch 202 is in the on-state, and as to connect the terminal tm1 to the terminal tm2 when the power-supply on/off switch 202 is in the off-state. That is, the circuit changeover switch 222 carries out the switching of the terminal connection in linkage with the turning on/off of the power-supply on/off switch 202.

When in the circuit of FIG. 7, the power-supply on/off switch 202 is in the on-state and thus the DC supply voltage Vcc is effectively applied to the LED series circuit 130, the terminal tm1 is connected to the terminal tm3 in the circuit changeover switch 222. Therefore, the inverting input terminal of the operational amplifier 221 is coupled to the connecting node between the emitter of the transistor Q21 and the current detection resistor R1. Consequently, the constant current circuit 220-2 forms the same circuit configuration as that of the constant current circuit 220-1 of FIG. 6. That is, the operational amplifier 221 operates as a differential amplifier circuit and implements constant current control.

When in this state, the power-supply on/off switch 202 is turned to the off-state to stop the application of the DC supply voltage Vcc, the circuit changeover switch 222 is also switched in response to this turning-off from the state where the terminals tm1 and tm3 are connected to each other to the state where the terminals tm1 and tm2 are connected to each other.

Due to the connection of the terminals tm1 and tm2 of the circuit changeover switch 222, the inverting input terminal of the operational amplifier 221 is connected to the output terminal in a short-circuit manner. According to this circuit configuration, the operational amplifier 221 operates as a voltage follower. That is, the voltage at the same level as the reference voltage Vref input to the non-inverting input terminal is output from the output terminal.

In the circuit of FIG. 6, when the application of the DC supply voltage Vcc is in the off-state, the output (potential Vb) of the operational amplifier 221 increases to the maximum output value of the operational amplifier 221. In contrast, in the circuit of FIG. 7, the reference voltage Vref is output from the operational amplifier 221. When the drive current ILED of the steady value is applied, the output voltage value (potential Vb) of the operational amplifier 221 is equal to the voltage value arising from addition of the reference voltage Vref to the voltage Vbe between the base and emitter of the transistor Q21. Consequently, in the circuit of FIG. 7, when the application of the DC supply voltage Vcc is in the off-state, the potential Vb that can be regarded as being equivalent to or somewhat lower than the potential Vb in the steady state is obtained. That is, compared with in the circuit of FIG. 6, a sufficiently lower potential Vb arises.

A description will be made below about the situation where the power-supply on/off switch 202 is turned from the off-state to the on-state and hence the application of the DC supply voltage Vcc is started. FIG. 8B shows the waveforms of the detected voltage Vr, the potential Vb, and the DC supply voltage Vcc, relating to the turning of the power-supply on/off switch 202 from the off-state to the on-state.

Also in FIG. 8B, the power-supply on/off switch 202 is turned from the off-state to the on-state at the timing t0 similarly to FIG. 8A. At the timing t0, the circuit changeover switch 222 is switched from the state where the terminal tm1 is connected to the terminal tm2 to the state where the terminal tm1 is connected to the terminal tm3, so that a differential amplifier circuit is formed and thus constant current control operation is started. At this timing, the potential vb is kept equivalent to the reference voltage Vref. In FIG. 8B, the voltage value of the potential Vb equivalent to the reference voltage Vref is indicated as Lv13.

As the constant current control operation after the timing t0, the output of the operational amplifier 221 is changed from the voltage value Lv13 equivalent to the reference voltage Vref so as to be settled at the voltage value Lv2 equivalent to the steady value. Also as described above, the difference between the voltage values Lv13 and Lv2 is substantially equivalent to the voltage Vbe between the base and emitter of the transistor Q21. This difference is considerably smaller than that between the maximum output value Lv12 and the steady voltage value Lv2 shown in FIG. 8A. Also in the operation shown in FIG. 8B, during the transition of the potential Vb as the output of the operational amplifier 221 from the voltage value Lv13 to the voltage value Lv2, the potential Vb varies along the slope dependent upon the slew rate of the operational amplifier 221. However, because the potential difference is small, the time until the potential Vb reaches the voltage value Lv2 after changing from the voltage value Lv13, i.e., the constant-current response time, is equivalent to the period T1 from the timing t0 to the timing t1 in FIG. 8B. This period T1 is considerably shorter than the period T2, which is the constant-current response time shown in FIG. 8A.

Actual constant-current response time as the period T1 shown in FIG. 8B is e.g. about 1.5 µs. As described above, it may be required that the constant-current response time be about 2 µs for e.g. partial light emission driving. Therefore, this constant-current response time meets this requirement sufficiently. That is, the present embodiment employs a configuration that allows the partial light emission driving in terms of practical use.

In the configuration of FIG. 7, one power-supply on/off switch 202 is provided in common to the plural LED series circuits 130 included in the corresponding backlight unit 300. In contrast, the circuit changeover switch 222 is provided for each of the LED series circuits 130 because it is provided in the constant current circuit 220-2. Therefore, in actual partial light emission driving on a backlight unit basis, when the controller 18 implements on/off control of the power-supply on/off switch 202 for a certain one backlight unit 300, the controller 18 simultaneously controls switching of the plural circuit changeover switches 222 each corresponding to a respective one of the plural LED series circuits 130 in the same backlight unit 300.

Figure 9:
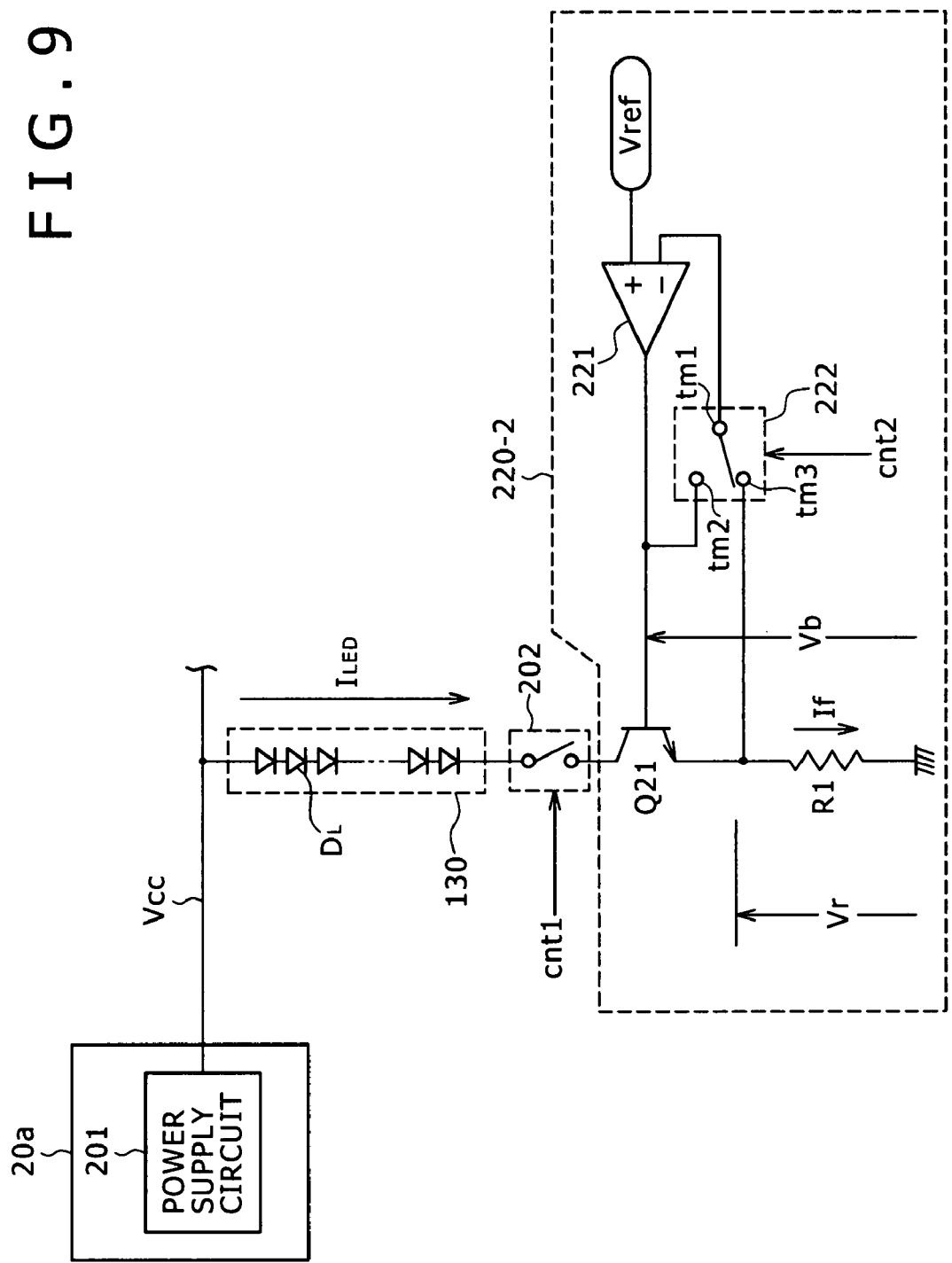
FIG. 9 is a diagram showing a modification of the drive circuitry for one LED series circuit according to the embodiment.

FIG. 9 shows one of modifications of the circuit configuration shown in FIG. 7. The same parts in FIG. 9 as those in FIG. 7 are given the same numerals and description thereof will be omitted.

In FIG. 7, the power-supply on/off switch 202 is included in the backlight-unit power supply 20*a*. In contrast, in the example of FIG. 9, the power-supply on/off switch 202 is removed from the backlight-unit power supply 20*a* and the output line of the DC supply voltage Vcc from the power supply circuit 201 is connected to the LED series circuit 130 directly. Furthermore, the power-supply on/off switch 202 is provided on the line between the cathode-side end of the LED series circuit 130 and the collector of the transistor Q21. That is, in this configuration, the power-supply on/off switch 202 is provided for each of drive circuits each corresponding to a respective one of the LED series circuits 130, which are connected to the DC supply voltage Vcc in parallel. Therefore, in this configuration, the same number of the power-supply on/off switches 202 as the number of the LED series circuits 130 should be provided in one backlight unit 300.

When the configuration of FIG. 9 is employed, the amount of the current that flows through each power-supply on/off switch 202 is smaller than that in the configuration of FIG. 7, in which the power-supply on/off switch 202 is provided in common to the plural LED series circuits 130. Simply stated, when the number of the LED series circuits 130 in the backlight unit 300 is defined as n, the current amount is reduced to 1/n compared with in the configuration of FIG. 7. The reduction of the amount of the current that flows through the power-supply on/off switch 202 leads to an advantage that the current capacity of an element actually selected as the power-supply on/off switch 202 may be low. Thus, it is expected that the turning on/off response performance of the power-supply on/off switch 202 is enhanced for example. In addition, the lower current capacity leads also to lower cost per one switch. Therefore, there is a possibility that, as a result, the total cost is lower than the cost of the power-supply on/off switch 202 provided in common to the plural LED series circuits 130 in the configuration of FIG. 7. Furthermore, there is also a possibility that the size of each power-supply on/off switch 202 is reduced and thus the entire display can be miniaturized.

Figure 10:
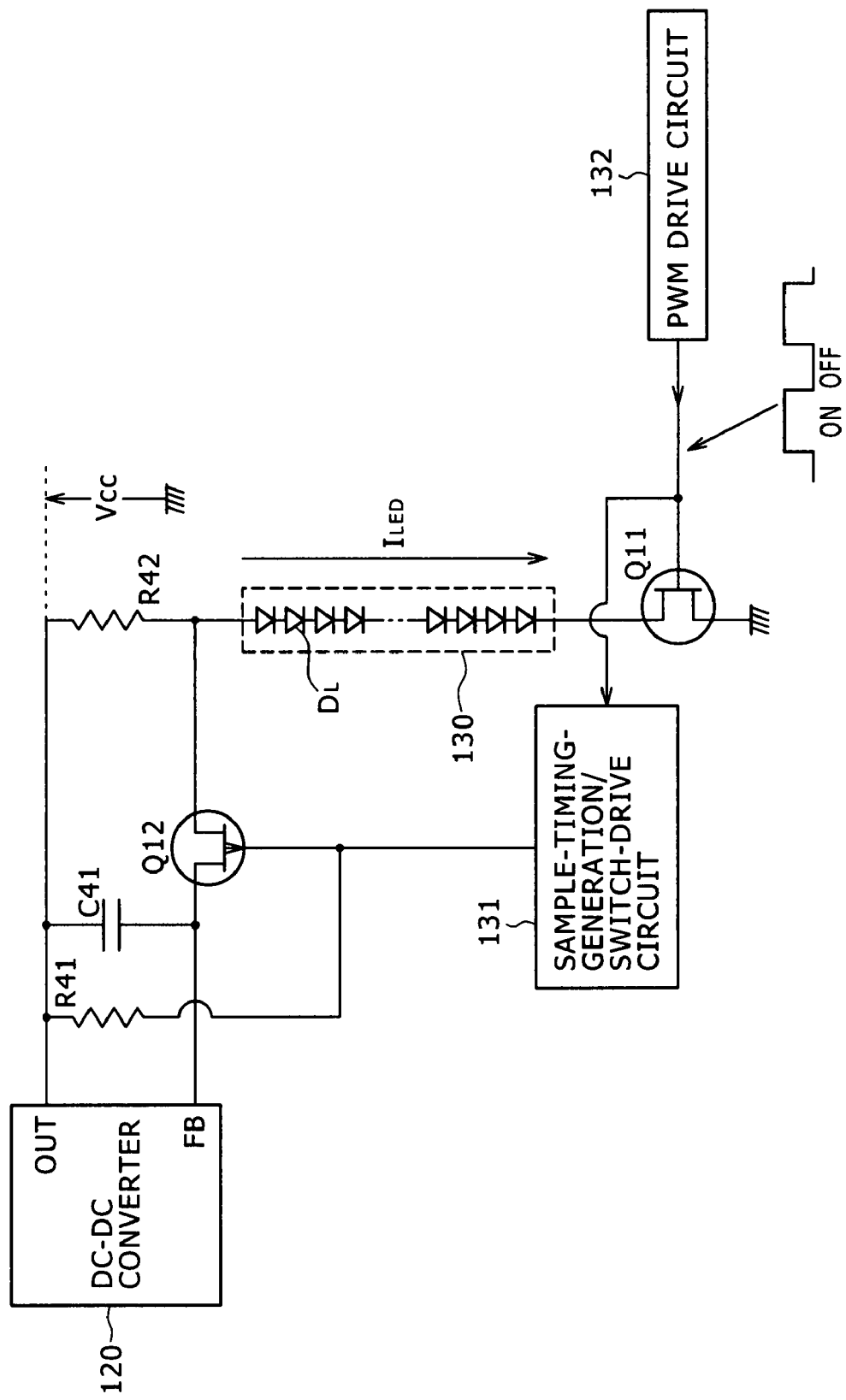
FIG. 10 is a diagram showing a configuration example of known drive circuitry for one LED series circuit for comparison with the embodiment.

As one of configurations for light emission driving in a liquid crystal display that employs light emitting diodes as its backlight like the present embodiment, the configuration shown in FIG. 10 is known. FIG. 10 also shows the configuration for light emission driving of one series connection circuit of light emitting diodes (LED series circuit 130) similarly to e.g. FIG. 7.

The configuration of FIG. 10 includes a DC-DC converter 120 as a unit that produces and outputs the DC supply voltage Vcc. The DC-DC converter 120 is supplied with DC voltage and implements switching operation, so that the DC voltage is converted into AC voltage and then is further converted into predetermined DC voltage. The thus obtained DC voltage is output as the DC supply voltage Vcc.

The DC supply voltage Vcc is applied via a resistor R42 to the anode-side end of the LED series circuit 130 arising from series connection of light emitting diodes. This causes the drive current ILED to flow through the light emitting diodes DL in the LED series circuit 130.

Furthermore, the DC-DC converter 120 is configured to implement constant current control so that the drive current ILED with a constant amount can flow by detecting a voltage drop across the resistor R42 at predetermined timings with respect to the setting of the predetermined DC supply voltage Vcc. That is, the constant current control is implemented on the DC-DC converter side. For this constant current control, a resistor R41, a capacitor C41, a switch transistor Q12, and a sample-timing-generation/switch-drive circuit 131 are added. The sample-timing-generation/switch-drive circuit 131 generates sample/hold timings based on a PWM signal (rectangular wave signal) input via an AND gate 132, to thereby implement on/off control of the transistor Q12 functioning as a sample/hold switch at the sample/hold timings. Thus, the DC-DC converter 120 detects the voltage drop across the resistor R42 in accordance with the sample/hold timings. The DC-DC converter 120 implements the constant current control for power to be supplied as the DC supply voltage Vcc depending on the detected voltage drop level.

Furthermore, by a PWM signal supplied from a PWM drive circuit 132, a transistor Q11 is turned on/off with the cycle of the PWM signal, so that conduction/non-conduction of the drive current ILED is controlled. Through this control, the conduction time of the drive current ILED per unit time is controlled depending on the pulse width of the PWM signal in one cycle. This conduction time control allows variation control of the light emission amount of the light emitting diodes. That is, dimming control is permitted. As the cycle of the PWM signal, a time corresponding to a frequency of about 20 kHz to 30 kHz is employed.

A comparison will be made below between the configuration shown in FIG. 10 and the configuration of FIG. 7 (or FIG. 9) as the present embodiment. Both the configurations can be regarded as including a switch (the power-supply on/off switch 202 in FIG. 7 and the transistor Q11 in FIG. 10) that can turn on/off the application of the DC supply voltage Vcc for circuitry in which an output source (the power supply circuit 201 in FIG. 7 and the DC-DC converter 120 in FIG. 10) of the DC supply voltage Vcc is connected to the LED series circuit 130.

However, actual operation of a configuration like the configuration of FIG. 10, which has the combination between the DC-DC converter 120 with a constant current control function and the configuration for turning on/off the transistor Q11, is as follows. Specifically, in response to the turning on/off of the transistor, the DC supply voltage Vcc output from the DC-DC converter 120 varies in a certain variation range but is substantially continuously applied to the LED series circuit 130. This results in the state where the amount of the drive current ILED that flows through the LED series circuit 130 increases and decreases in response to the turning on/off of the transistor Q11. If PWM control is implemented for the on/off periods of the transistor Q11, the amount of the drive current that flows through the LED series circuit 130 per unit time can be changed depending the varied on/off periods, which can realize dimming control. For such dimming control, the response speed of the turning on/off of the DC supply voltage Vcc in response to the turning on/off of the transistor Q11 does not necessarily have to be high. The factors in the low response speed of the DC supply voltage Vcc in the configuration of FIG. 10 include the response speed of the stabilization control and the constant current control of the DC-DC converter 120, the cycle of the turning on/off of the transistor Q11, and so on. Therefore, it is difficult to enhance the response speed of the DC supply voltage Vcc based on the configuration of FIG. 10. This fact means also that it is difficult for the configuration shown in FIG. 10 to offer high-speed response operation that permits e.g. partial light emission driving.

In contrast, in the present embodiment, a linear power supply is employed as the power supply circuit 201, which is the generation source of the DC supply voltage Vcc. Furthermore, the constant current circuit 220-2 is separated from the power supply circuit side and provided on the cathode side of the LED series circuit 130. According to such a configuration, the power supply circuit 201 as the generation source of the DC supply voltage Vcc does not have to have a configuration for constant voltage control and constant current control. This allows the DC supply voltage Vcc to be turned on/off in response to the turning on/off timings of the power-supply on/off switch 202. That is, the response speed of the turning on/off of the DC supply voltage Vcc is enhanced, which allows partial light emission driving. Thus, the configuration of FIG. 10 is quite different from the configuration of the present embodiment shown in FIG. 7 (or FIG. 9) in terms of enhancement in the response speed of the on/off control of the DC supply voltage Vcc.

It should be noted that the present invention is not limited to the above-described configurations as the embodiment.

For example, according to the description with FIG. 7 or 9, when the application of the DC supply voltage Vcc is in the off-state, the operational amplifier 221 operates as a voltage follower, so that a voltage equivalent to the reference voltage Vref is output from the operational amplifier 221. However, the voltage value output from the operational amplifier 221 when the application of the DC supply voltage Vcc is in the off-state may be optionally changed to any value as long as the requisite constant-current response time can be designed according to a specific purpose such as partial light emission driving. That is, in an embodiment of the present invention, it is necessary to set a voltage value of which difference from the reference voltage Vref is within a predetermined range in view of acquisition of the required constant-current response time.

In addition, for the change of the setting value of the output voltage of the operational amplifier 221, a circuit form other than a voltage follower may be employed.

In the above-described embodiment, the DC supply voltage Vcc is turned on/off on the premise that partial light emission driving is carried out. However, the present invention can be applied also to the turning on/off of the DC supply voltage Vcc for another purpose.

Moreover, it is also possible that the light source device including a configuration for driving light emitting diodes according to the present embodiment is used as a light source other than a backlight. For example, it would be possible to use the light source device as a light source for a projector device that projects images on a screen. In addition, besides a light source for such a display, the light source device might be used as a normal illumination device in some cases.

It should be understood by those skilled in the art that various modifications, combinations, sub-combinations and alterations may occur depending on design requirements and other factors insofar as they are within the scope of the appended claims or the equivalents thereof.

The invention claimed is:

1. A drive device for a light emitting diode element, the device comprising:
   a light emitting diode element circuit part configured to be formed by connecting at least one light emitting diode element based on a predetermined connection form;
   a power supply unit configured to generate a direct-current (DC) supply voltage for driving the at least one light emitting diode element of the light emitting diode element circuit part for light emission of the light emitting diode element, and apply the DC supply voltage to the light emitting diode element circuit part;
   a power-supply application on/off unit configured to be provided to turn on/off application of the DC supply voltage to the light emitting diode element circuit part; and
   a current control circuit part configured to be caused to switch its operation so as to carry out constant current operation if application of the DC supply voltage is in an on-state and carry out voltage keeping operation if application of the DC supply voltage is in an off-state, the constant current operation being to implement variation control of an amount of a drive current that flows through the light emitting diode element circuit part by an amplified output voltage dependent upon a difference between a voltage detection value detected depending on the amount of the drive current and a predetermined reference voltage value, the voltage keeping operation being to keep the amplified output voltage at a predetermined value of which difference from the reference voltage value is within a predetermined range.

2. The drive device for the light emitting diode element according to claim 1, wherein
   the current control circuit part includes:
   a current detection resistor that is provided to detect a current that flows through the light emitting diode element circuit part;
   an operational amplifier that has a non-inverting input terminal to which the reference voltage value is input;
   an amplifier element that has a control input terminal to which an amplified output voltage of the operational amplifier is applied, and is provided to vary an amount of a current that flows through the light emitting diode element circuit part; and
   a path changeover unit that implements switching to input a voltage across the current detection resistor to an inverting input terminal of the operational amplifier as the voltage detection value if application of the DC supply voltage is in an on-state, and connect the inverting input terminal to an output terminal of the operational amplifier if application of the DC supply voltage is in an off-state.

3. The drive device for the light emitting diode element according to claim 1, wherein
   the power supply unit has a configuration for generating the DC supply voltage in such a way that a time shorter than a certain time is obtained as a response time until completion of transition of a voltage value of the DC supply voltage in response to switching of application of the DC supply voltage to the light emitting diode element circuit part from an off-state to an on-state, from a voltage value arising in the off-state to a voltage value that is obtained in the on-state.

4. A light source device comprising:
   a light emitting diode element circuit part configured to be formed by connecting at least one light emitting diode element serving as a light source based on a predetermined connection form;
   a power supply unit configured to generate a direct-current (DC) supply voltage for driving the at least one light emitting diode element of the light emitting diode element circuit part for light emission of the light emitting diode element, and apply the DC supply voltage to the light emitting diode element circuit part;
   a power-supply application on/off unit configured to be provided to turn on/off application of the DC supply voltage to the light emitting diode element circuit part; and
   a current control circuit part configured to be caused to switch its operation so as to carry out constant current operation if application of the DC supply voltage is in an on-state and carry out voltage keeping operation if application of the DC supply voltage is in an off-state, the constant current operation being to implement variation control of an amount of a drive current that flows through the light emitting diode element circuit part by an amplified output voltage dependent upon a difference between a voltage detection value detected depending on the amount of the drive current and a predetermined reference voltage value, the voltage keeping operation being to keep the amplified output voltage at a predetermined value of which difference from the reference voltage value is within a predetermined range.

5. A display comprising:

a light source device; and an image display panel configured to display an image by use of light emitted from the light source device; wherein the light source device includes a light emitting diode element circuit part that is formed by connecting at least one light emitting diode element serving as a light source based on a predetermined connection form, a power supply unit that generates a direct-current (DC) supply voltage for driving the at least one light emitting diode element of the light emitting diode element circuit part for light emission of the light emitting diode element, and applies the DC supply voltage to the light emitting diode element circuit part, a power-supply application on/off unit that is provided to turn on/off application of the DC supply voltage to the light emitting diode element circuit part, and a current control circuit part that is caused to switch its operation so as to carry out constant current operation if application of the DC supply voltage is in an on-state and carry out voltage keeping operation if application of the DC supply voltage is in an off-state, the constant current operation being to implement variation control of an amount of a drive current that flows through the light emitting diode element circuit part by an amplified output voltage dependent upon a difference between a voltage detection value detected depending on the amount of the drive current and a predetermined reference voltage value, the voltage keeping operation being to keep the amplified output voltage at a predetermined value of which difference from the reference voltage value is within a predetermined range.

6. The display according to claim 5, wherein the light source device includes a plurality of the light emitting diode elements that are two-dimensionally arranged corresponding to the image display panel, and is formed of a plurality of unit parts including predetermined light emitting diode elements of the arranged light emitting diode elements, each of the unit parts includes the light emitting diode element circuit part, the power supply unit, the power-supply application on/off unit, and the current control circuit part, and a controller in the display implements on/off control of the power-supply application on/off unit and operation switching control of the current control circuit part for each of the unit parts independently.

* * * * *